United States Patent
Gomi et al.

(10) Patent No.: US 10,379,300 B2
(45) Date of Patent: Aug. 13, 2019

(54) METHOD FOR ASSEMBLING OPTICAL MODULE

(71) Applicant: Sumitomo Electric Device Innovations, Inc., Yokohama-shi (JP)

(72) Inventors: Yuji Gomi, Yokohama (JP); Isao Baba, Yokohama (JP)

(73) Assignee: Sumitomo Electric Device Innovations, Inc., Yokohama-shi (JP)

( * ) Notice: Subject to any disclaimer, the term of this patent is extended or adjusted under 35 U.S.C. 154(b) by 0 days.

(21) Appl. No.: 15/311,427

(22) PCT Filed: Mar. 23, 2016

(86) PCT No.: PCT/JP2016/060870
§ 371 (c)(1),
(2) Date: Nov. 15, 2016

(87) PCT Pub. No.: WO2016/153076
PCT Pub. Date: Sep. 29, 2016

(65) Prior Publication Data
US 2018/0003907 A1 Jan. 4, 2018

(30) Foreign Application Priority Data
Mar. 24, 2015 (JP) ................. 2015-060328

(51) Int. Cl.
*G02B 6/42* (2006.01)
*G02B 6/00* (2006.01)
(Continued)

(52) U.S. Cl.
CPC .......... *G02B 6/4228* (2013.01); *B23K 11/002* (2013.01); *G01B 3/56* (2013.01);
(Continued)

(58) Field of Classification Search
CPC .. G02B 6/4228; G02B 6/4206; G02B 6/4226; G02B 6/4292; G02B 6/4204; G01L 5/00; B23K 11/002; G01B 3/56
See application file for complete search history.

(56) References Cited

U.S. PATENT DOCUMENTS 5,623,337 A 4/1997 Iori et al.
9,533,911 B2 * 1/2017 Owen ................ G02B 6/02052

FOREIGN PATENT DOCUMENTS

JP H05-303029 A 11/1993
JP H09-304661 A 11/1997
(Continued)

OTHER PUBLICATIONS

International Search Report and Written Opinion in International Application No. PCT/JP2016/060870, dated Jul. 5, 2016.

*Primary Examiner* — Rick K Chang
(74) *Attorney, Agent, or Firm* — Baker Botts L.L.P.; Michael A. Sartori (57) ABSTRACT

An alignment apparatus and an alignment method that enables to align an optical device with a receptacle, where the optical device and the receptacle have respective axes tilted to each other. The method includes steps of: (1) obtaining a minimum pressure caused to the optical device from the receptacle as varying a rolling angle around the X-axis of the optical device but fixing the pitching angle around the Y-axis at a rotating angle around the Z-axis; (2) determining a rotating angle where thus obtained minimum pressure becomes the minimum; and (3) iterating those procedures until the rotating angle obtained as varying the rolling angle and another rotating angle obtained as varying the pitching angle substantially coincides to each other.

7 Claims, 12 Drawing Sheets

(51) Int. Cl.
*B23K 11/00* (2006.01)
*G01B 3/56* (2006.01)
*G01L 5/00* (2006.01)

(52) U.S. Cl.
CPC .................. *G01L 5/00* (2013.01); *G02B 6/00* (2013.01); *G02B 6/4206* (2013.01); *G02B 6/4226* (2013.01); G02B 6/4204 (2013.01); G02B 6/4292 (2013.01)

(56) References Cited

FOREIGN PATENT DOCUMENTS

| | | |
|---|---|---|
| JP | 10-062647 A | 3/1998 |
| JP | 2000-241674 A | 9/2000 |
| JP | 2004-233505 A | 8/2004 |
| JP | 2004-297051 A | 10/2004 |
| JP | 2005-134529 A | 5/2005 |
| JP | 2008-046271 A | 2/2008 |

* cited by examiner

METHOD FOR ASSEMBLING OPTICAL MODULE

TECHNICAL FIELD

The present application relates to a method for producing an optical module.

BACKGROUND ART

A Japanese Patent Application laid open No, JP-H09-304661A has disclosed a method to produce a bi-directional optical module, where the method includes a step to assemble an optical ferrule and a sleeve with an intermediate product of the optical module that installs a semiconductor Laser Diode (LD). The process practically activates the LD and detects optical power of an optical beam output from the LD by, for instance, a power meter as an electrical signal. The method compares thus obtained electrical signal with a preset value, and aligns the optical ferrule within a plane perpendicular to an optical axis of the optical module, and the position of the sleeve, into which the optical ferrule is inserted.

When an optical module assembles with optical components such as an optical ferrule, the optical components are necessary to be aligned with a semiconductor optical element installed within the optical module. However, the optical module itself generally assembles various parts, such as a cap having a lens and/or a stem mounting the semiconductor optical element thereon, where the cap and the stem constitute an optical device that encloses the semiconductor optical element therein. Accordingly, when an optical sleeve that is to receive an external optical ferrule secured in an end of an external optical fiber to be optically coupled with the semiconductor device is to be fixed with the cap of optical device, the cap is not always precisely aligned with the semiconductor optical element mounted on the stem. That is, the cap is not always precisely aligned with the stem, in particular, the cap is sometimes fixed to the stem with an inclined angle. Accordingly, the in order to precisely align the sleeve with the cap, the cap is necessary to precisely head on the sleeve to be fixed.

SUMMARY OF INVENTION

An aspect of the present application relates to a method of assembling an optical module, where the optical module comprises an optical device and a receptacle. The optical device installs an optical element that generates or receives an optical signal. The receptacle receives an external optical fiber which optically couples with the optical element enclosed in the optical device. The method of the present invention includes steps of: (1) making the optical device in contact to the receptacle by lifting the receptacle down to the optical device; (2) making an axis of the optical device along a Z-direction in parallel to an axis of the receptacle along the Z-axis; and (3) aligning the axis of the optical device with the axis of the receptacle. One of features of the method is that the step (2) includes steps of: (2-1) determining a rotating angle of the optical device with respect to the receptacle at which the optical device causes a minimum pressure against the receptacle, as varying a rolling angle but fixing a pitching angle of the optical device with respect to the receptacle; (2-2) determining another rotating angle of the optical device with respect to the receptacle at which the optical device causes another minimum pressure against the receptacle, as varying the pitching angle but fixing the rolling angle, and (2-3) iterating the steps (2-1) and (2-2) until the rotating angle substantially coincides with the another rotating angle.

In the method of the present application, the rolling angle is around an X-direction perpendicular to the Z-direction and the pitching angle is around a Y-direction perpendicular to the Z-direction and the X-direction.

Another aspect of the present application relates to an apparatus or a positioner that aligns an optical device with a receptacle. The positioner of the present application includes a base, a goniometer, and a pressure sensor. The base mounts a stem included in the optical device. The goniometer includes a rolling stage, a pitching stage, a rotating stage, an X-sliding stage, and a Y-sliding stage; and positions the optical device on the base with respect to the receptacle. The pressure sensor, which is put between the base and the goniometer, may senses a pressure applied to the base from the receptacle.

DESCRIPTION OF EMBODIMENTS

Next, some examples of a process for assembling an optical module according to the present invention will be described as referring to drawings. However, it will be apparent that a scope of the present invention is not restricted to embodiment, and the invention could include a scope not only explicitly indicated by claims but also all modifications and changes within the scope of the claims and equivalents thereof. Also, in the description of the drawings, numerals or symbols same with or similar to each other will refer to elements same with or similar to each other without duplicated explanations.

Figure 1:
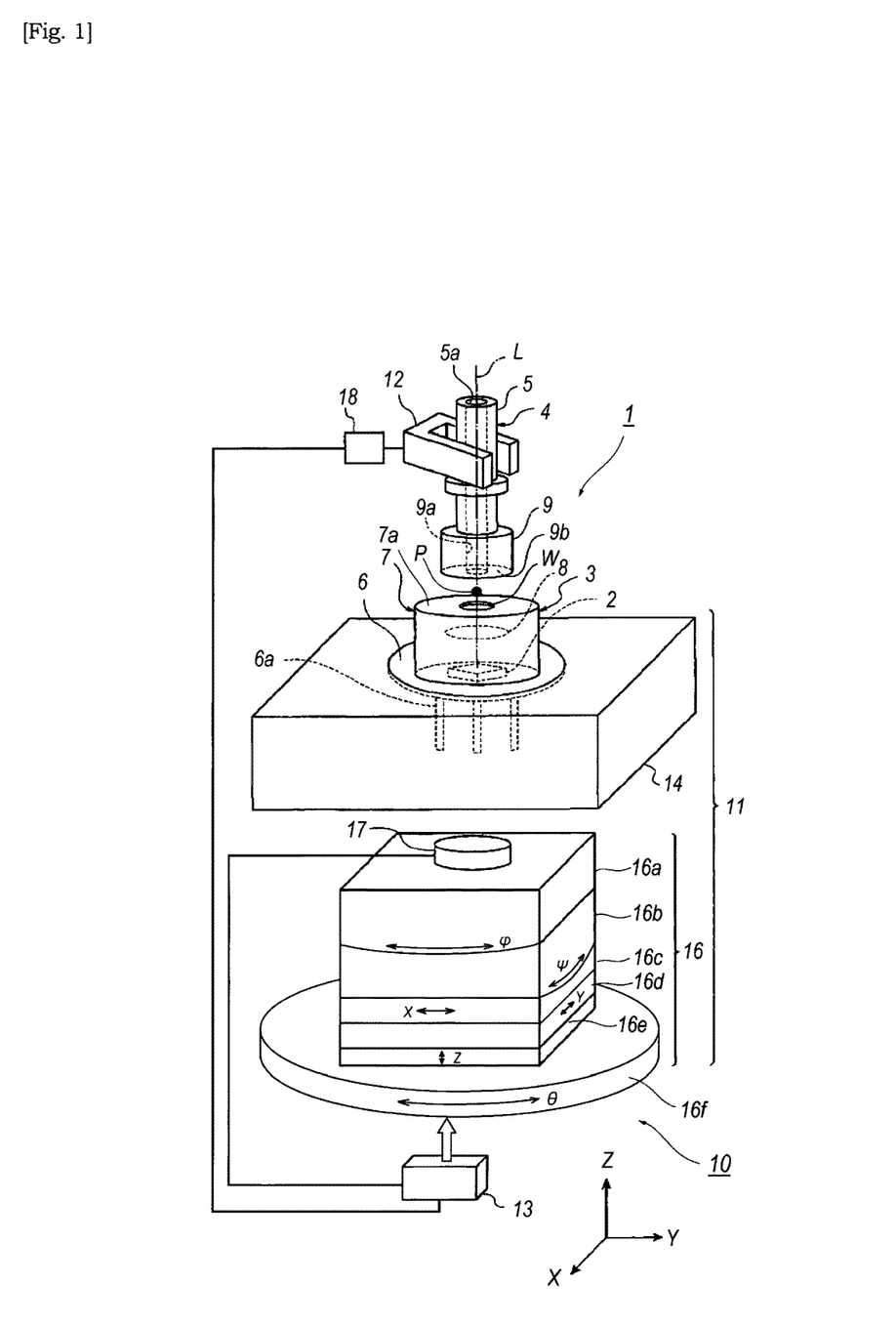
FIG. 1 schematically illustrates an optical module and an apparatus that assembles and aligns the optical module having an optical device and a receptacle.

First, arrangements of an optical module assembled by a process according to an embodiment of the present invention will be described. The optical module is an apparatus that converts an electrical signal into an optical signal. As illustrated in FIG. 1, the optical module 1 includes an optical device 3 and an optical receptacle 4 fixed to the optical device 3. The semiconductor optical element 2 may be a type of a semiconductor laser diode (LD) in the present embodiment. The LD 2 converts an electrical signal supplied thereto through the lead pins 6a into an optical signal and emits thus converted optical signal toward the optical receptacle 4 along an optical axis L of the optical device 3. The description herein below concentrates an arrangement that the optical module 1 is a type of a transmitter optical module that emits an optical signal, but the semiconductor element 2 is not restricted to those LDs. The optical module 1 may install a light-receiving device typically a semiconductor photodiode (PD). The description below assumes that the direction Z is in parallel to the optical axis L of the optical module 1, and two axes perpendicular to the optical axis L are assumed to the X- and the Y-axes, respectively.

The optical device 3, which includes a stem 6 and a cap 7 that forms a space into which the semiconductor element 2 is air-tightly enclosed, electrically connects the semiconductor element 2 in the space to an electronic circuit mounted on a circuit board on which the optical module 1 is installed thereon. The optical device 3 may further install optical components 8 such as a lens, an optical isolator, and so on within the space. A lens may be assembled with the cap 3 so as to seal an opening W of the cap 7.

The stem 6 has a disk shape and a plurality of lead pins 6a that pass through the stem 6a and protrude externally. The stem 6 fixes the LD 2 thereon with an adhesive and/or eutectic solder. The terminals 6a in outer ends thereof are connected to the circuit board, while the inner ends thereof are connected to LD 2 through bonding wires. The cap 7, which has a cylindrical shape, is arranged on the stem 6 such that the axis of the cylinder is substantially aligned with the axis of the disk shaped stem 6. The cap 7 is welded to the stem 6 by, for instance, resistance welding. The cap 7 in a ceiling 7a thereof forms the space accompanied with a side wall 7b thereof and the stem 6 into which the semiconductor element 2 is air-tightly enclosed. The ceiling 7a extends substantially in perpendicular to the optical axis L, that is, the ceiling 7a extends substantially in parallel to the stem 6. The ceiling 7a may provide a window W through which the optical beam emitted from the semiconductor element 2 passes. The optical module 1 may provide, substituted from the window W, an optical lens that collimates or concentrate an optical beam output from the semiconductor element 2 or concentrate an optical beam externally provided to the optical module 1 onto the semiconductor element 2 in the space. Because the resistance welding or the like to assemble the cap 7 with the stem 6 sometimes causes misalignment between the semiconductor element 2 and a center of the cap 7 and a substantial angle between the axis of the stem 6 and the center axis of the cap 7.

The optical receptacle 4, which may mechanically and optically couple an external fiber to the optical device 3, includes a sleeve 5 and a holder 9. The sleeve 5 optically aligns the external fiber with the semiconductor element 2 in the optical device 3 and has a bore 5a extending from an end to the other end thereof. The holder 9 also provides a bore 9a continuous to the bore 5a of the sleeve 5 as aligning the centers of two bores, 5a and 9b, but the centers of the bores, 5a and 9a, are unnecessary to be precisely and exactly aligned with the optical axis L. The optical axis L is necessary at least to be within the bores, 5a and 9b. In other words, the holder 9 is assembled with the optical device 3 such that the optical axis L is within the bore 9a; and the sleeve 5 is assembled with the holder 9 such that the optical axis L is within the bore 5a. The optical axis L does not intersect the walls of the bores, 5a and 9a. The holder 9 further provides an end surface 9b to be fixed to the ceiling 7a of the cap 7. The end surface 9b is substantially perpendicular to the optical axis L.

Next, a positioner 10 for assembling the optical module 1 will be described. A feature of the positioner 10 of the present embodiment is that the positioner 10 may measure a rotating angle of the cap 7 with respect to the optical receptacle 4 at which a tilt angle between the optical axis L and the center of the optical receptacle 4 becomes a minimum. The positioner 10 includes a stage 11, an arm 12, and a controller 13. The goniometer 16 may adjust attitudes of the cap 7; specifically, (i) a rolling $\varphi$ around the X axis; (ii) a pitching $\psi$ around the Y axis; (iii) a rotation $\theta$ around the Z axis; (iv) a lateral position dx along the X axis; (v) a longitudinal position dy along the Y axis; and (vi) a horizontal level dz along the Z axis. The stage 11 also measures a load affected to the cap 7 from the optical receptacle 4 along the Z axis. The stage 11 includes a base 14, a goniometer 16, and a pressure sensor 17. The base 14 supports the stem 6 of the cap 7 so as to determine a level of the cap 7. The goniometer 16 supports the base 14 and has six movable stages, 16a to 16f, to perform the adjustment of six axes, $\varphi$ to dz, described above. Although the embodiment shown in FIG. 1 provides the mechanism for the Z-alignment in the goniometer 16, the arm 12 may provide this mechanism to slide the arm 12 up and down. Moreover, in an alternate, the positioner 10 may provide a chuck, instead of the arm 12, to support the optical receptacle 4. That is, the chuck radially supports the optical receptacle 4 and rotates and vertically moves; so the goniometer 16 may omit the rotating stage 16f and the vertical slider 16e. Also, the rolling $\varphi$ and the pitching $\psi$ around the X and Y axes, respectively, rotate the rolling stage 16a and the pitching stage 16y around a virtual point P as a center of the rolling and the pitching. The vertical level of the virtual point P does not always coincide with the level of the ceiling 7a of the cap 7. The arm 12, which supports the receptacle 4, may be driven by a pulse motor. The controller 13 may control the goniometer 16 and the pulse motor 18, and collect information output from the pressure sensor 17. The controller 13 sets the pitching $\varphi$ and the rolling $\psi$ of the goniometer 16, and the level of the arm 12 along the Z direction, the rotation $\theta$ around the axis L, and processes data output from the pressure sensor 17.

Figure 2:
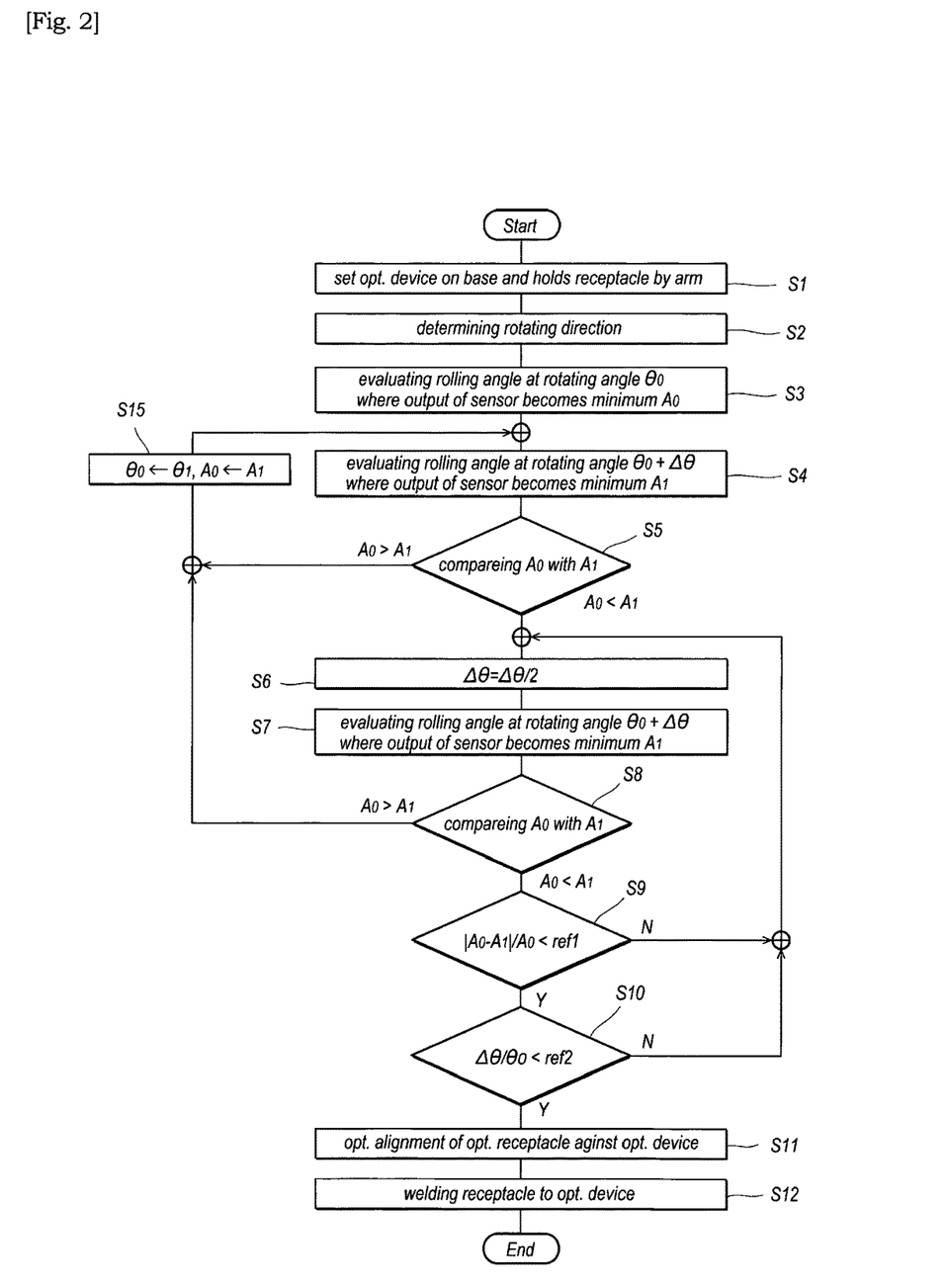
FIG. 2 shows a flowchart to assemble the optical device with the receptacle.

Next, a method to assemble the optical module 1 according to an embodiment of the present application will be described as referring to a flow chart shown in FIG. 2. The description below will optionally refer to FIGS. 3 to 8.

Figure 3:
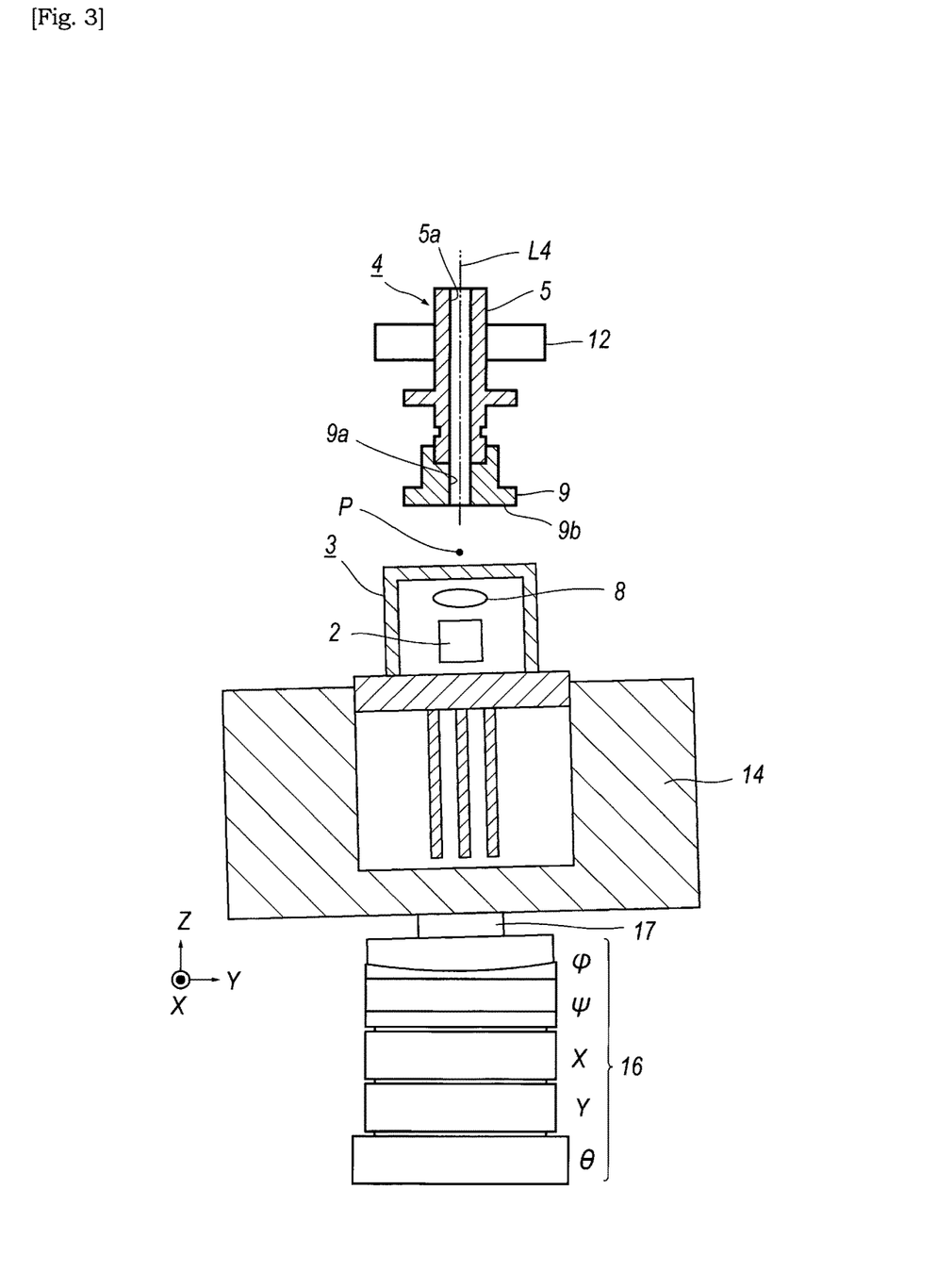
FIG. 3 schematically illustrates a process to assemble the optical device with the receptacle.

The process first mounts the optical device 3 on the base 14 and manipulates the optical receptacle 4 by the arm 12 at step S1 as shown in FIG. 3; that is, the arm 12 holds the receptacle 4 such that the receptacle 4 in a center thereof, namely, axes of bores, 5a and 9a, are aligned with or substantially in parallel to the Z axis. In advance to the step shown in FIG. 3, the sleeve 5 of the receptacle 4 is rigidly fixed to the holder 9 such that even when the arm 12 holds the sleeve 5, the holder 9 may be also held by the arm 12 through the sleeve 5. Then, the arm 12 adjusts lateral positions of the receptacle 4 within the XY plane such that the receptacle 4 in the axis thereof overlaps with the optical axis L.

Figure 4:
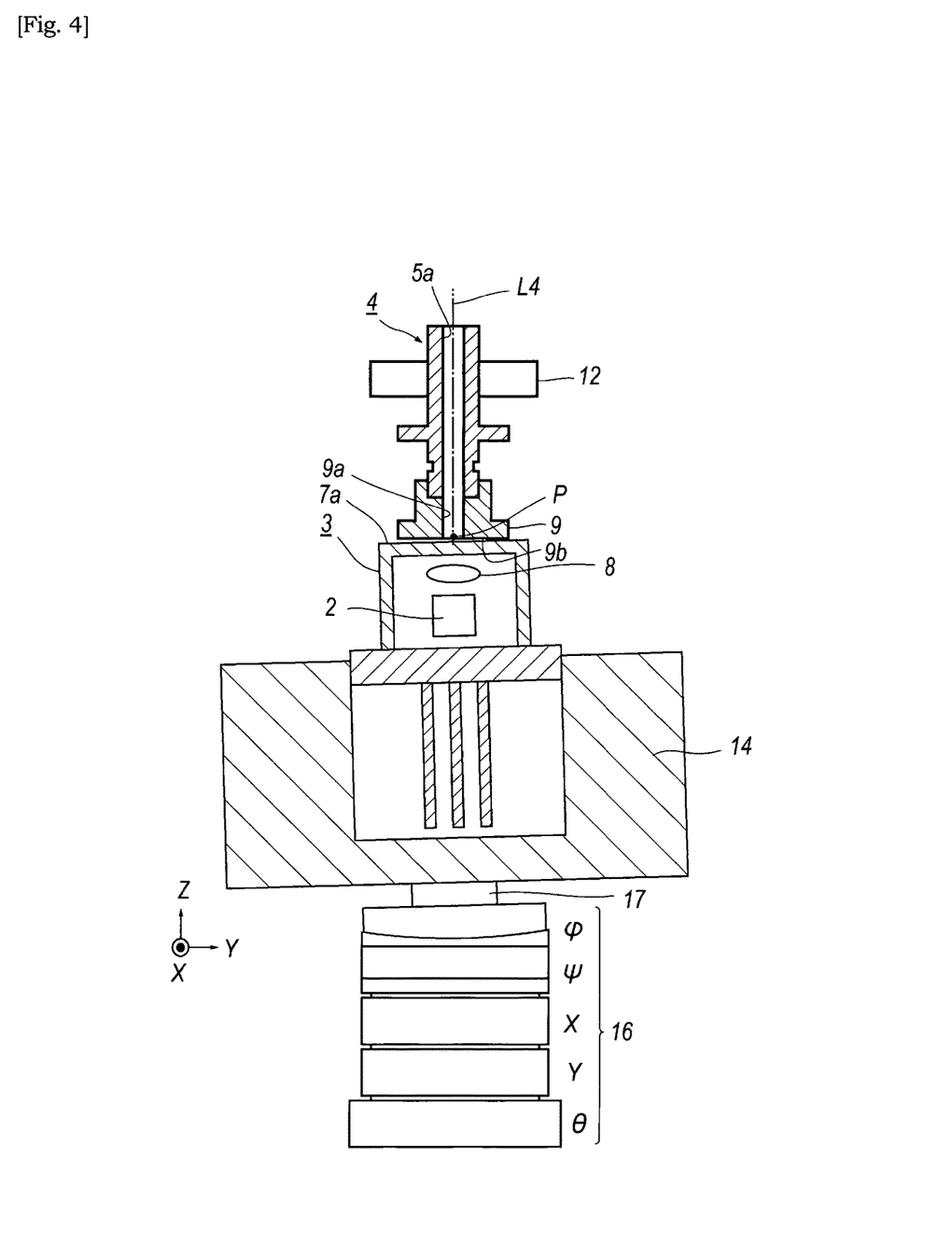
FIG. 4 schematically illustrates a process to assemble the optical device subsequent to the process shown in FIG. 3.

Then, the arm 12 lifts down the receptacle 4 along the Z axis toward the base 14 until the end surface 9b of the holder 9 is in contact to the ceiling 7a of the cap 7 as shown in FIG. 4. When the end surface 9b comes in contact to the ceiling 7a, the optical device 3 is pressed downward along the Z axis and the pressure sensor 17 increases an output thereof. Thus, the touch of the surface 9b to the ceiling 7a may be detected through the output of the pressure sensor 17. An operator may judge visually through an indicator of the controller 13 which displays the output of the pressure sensor 17, or the controller 13 may decide the touch by comparing the output of the pressure sensor 17 with a reference. The arm 12 may further lift the receptacle 4 down by a preset amount, for instance, 20 to 50 µm as holding the receptacle 4. That is, the arm 12 lifts the receptacle down to a level at which the end surface 9b of the holder 9 always touches to the ceiling 7a of the cap 7 independent of the rotating angle θ of the receptacle 4 with respect to the cap 7.

Figure 5:
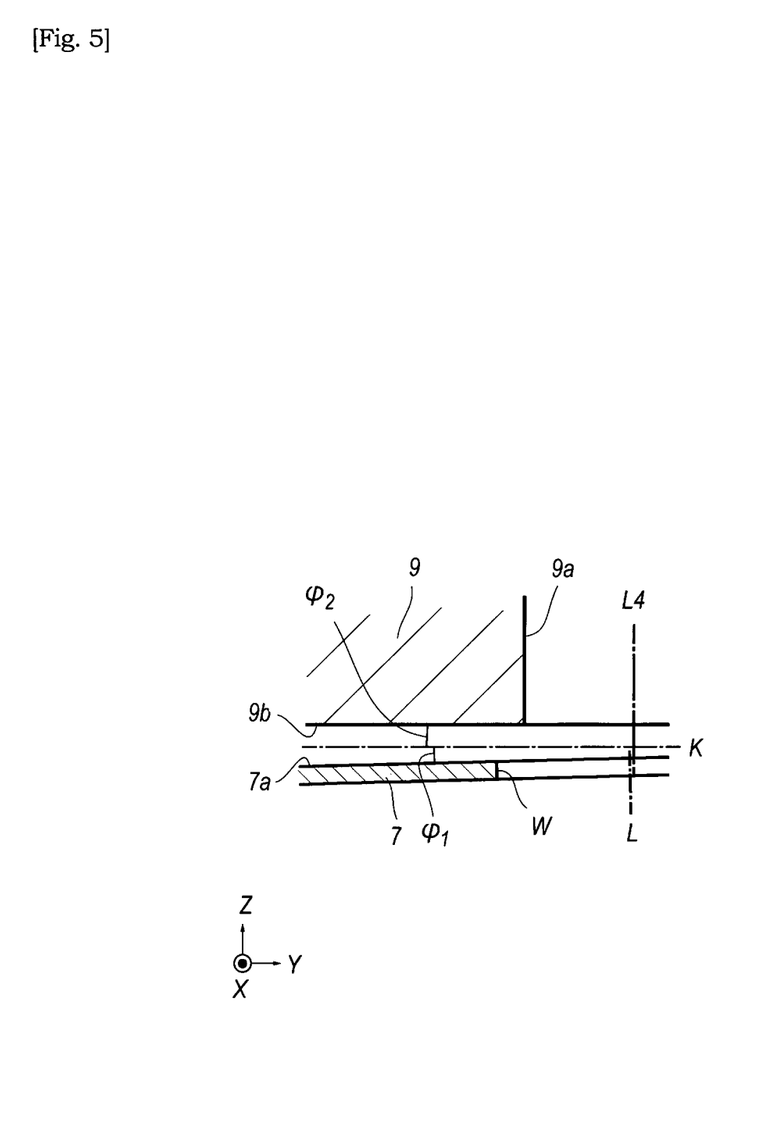
FIG. 5 magnifies a portion where an end surface of the receptacle faces the top of the optical device.

FIG. 5 magnifies a physical status between the end surface 9b and the ceiling 7a. The end surface 9b and the ceiling 7a are ideally in parallel to each other and in perpendicular to the optical axis L. However, as illustrated in FIG. 5, the ceiling 7a and the end surface 9b make substantial angles $\varphi 1$ and $\varphi 2$, respectively, with respect to a reference plane K that extends in perpendicular to the optical axis L. Note that the reference plane K is not always true horizontal, or the optical axis L of the optical device 3 is not always true vertical. These angles, $\varphi 1$ and $\varphi 2$, are not uniquely determined but depend on various factors. However, the optical device 3 is necessary to compensate with the rolling and/or the pitching of the end surface 9b in order to make even contact to the ceiling 7a. Where, the rolling $\varphi$ around the X axis means that the end surface 9b and/or the ceiling 7a rotate around the X axis, while, the pitching $\psi$ means that the surface 9b and/or the ceiling 7a rotate around the Y axis. A sum of two angles, $\varphi_1 + \varphi_2$, will be called as a tilt angle.

The process of the embodiment, then, evaluates the rotating angle $\theta_s$ at steps S4 to S10, where the rotating angle $\theta_s$ means that the direction of the end surface 9g becomes in parallel to the direction of the cap 7a at the rotating angle $\theta_s$, where the direction of respective surfaces are the inclined direction of the surfaces, 9b and 7a. Specifically, the process first determines the rotating direction by the rotating stage 16f, at step S2. Fixing the rolling angle $\varphi$ and the pitching angle $\psi$, the process rotates the base 14 and detects the output of the pressure sensor. Then, the process to determines the rotating direction such that the output of the pressure sensor 17 decreases as increasing the rotating amount, that is, the rotating direction may be set such that the output of the pressure sensor 17 shows a negative slope.

Figure 6:
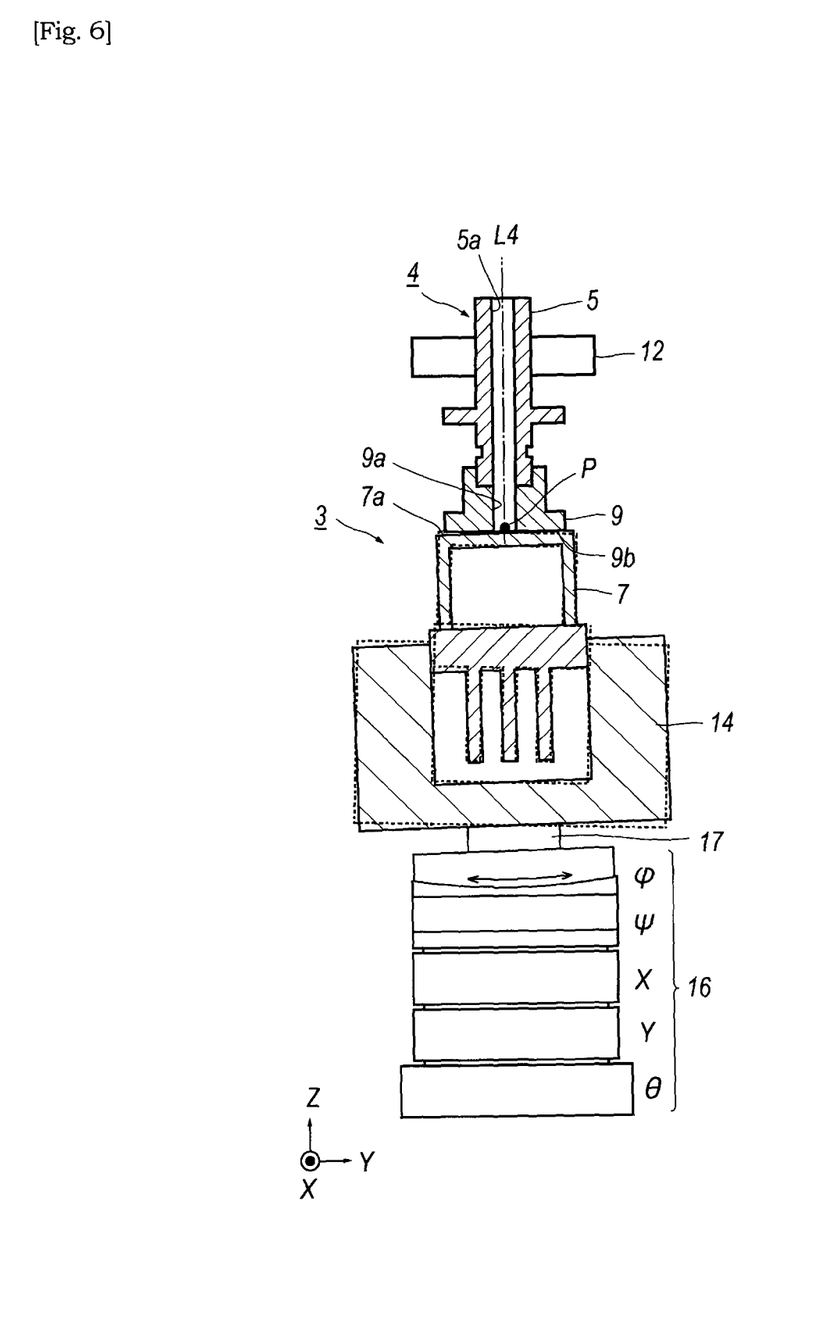
FIG. 6 schematically illustrates a process to obtain a minimum pressure at a rotating angle $\theta$ around the Z-direction as varying a rolling angle around the X-direction but fixing a pitching angle around the Y-direction.
Figure 7:
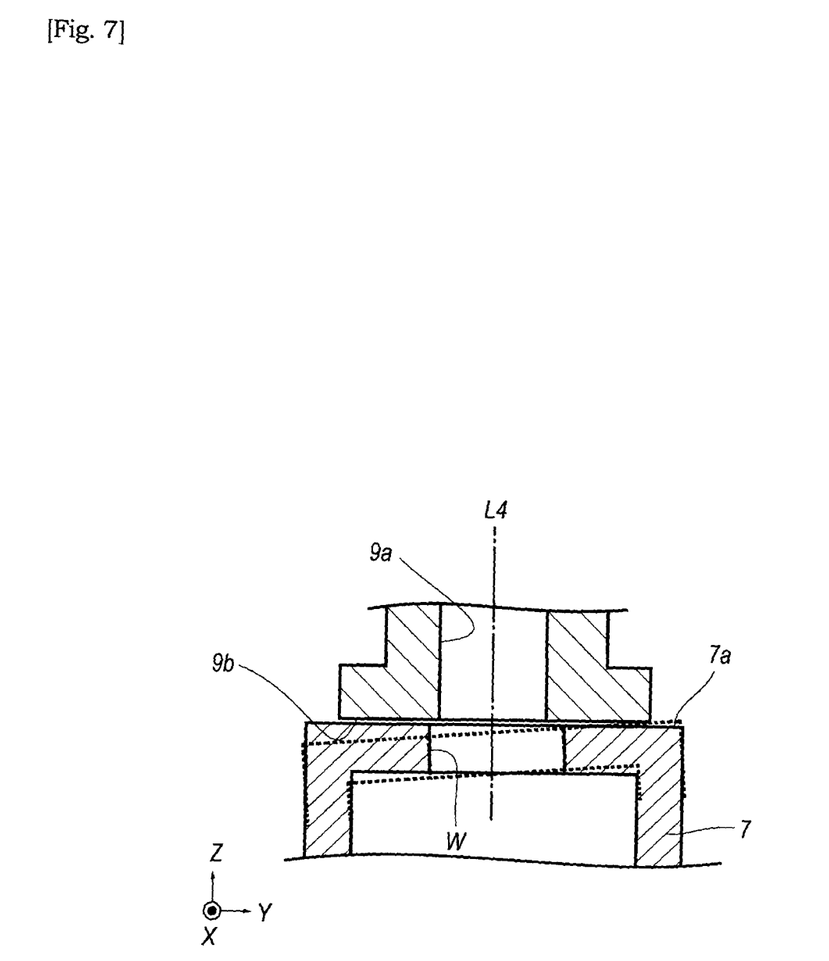
FIG. 7 magnifies a portion shown in FIG. 5 during the process shown in FIG. 6.

Then, step S3 shown in FIG. 6 may be performed that, fixing the rotating angle to be $\theta_0$ and the pitching angle $\psi$, the rolling angle $\varphi$ around the X-axis by the rolling stage 16a is varied, and an rolling angle $\varphi_0$ at which the output of the pressure sensor 17 shows a minimum $A_0$, where FIG. 6 schematically illustrates a process to obtain a minimum pressure at a rotating angle θ around the Z-direction as varying a rolling angle around the X-direction but fixing a pitching angle around the Y-direction, and FIG. 7 magnifies a portion shown in FIG. 5 during the process shown in FIG. 6. Specifically, an area of the surface 9b touches the ceiling 7a increases or decreases, which may be sensed by the pressure sensor 17, exactly, the output of the pressure sensor 17. Increasing the touching area, which means that the tile angle become closer to zero, namely, the end surface 9b and the ceiling 7a becomes closer to a state in parallel to each other, the output of the pressure sensor 17 decreases; while, decreasing the area, the output of the pressure sensor 17 increases. Accordingly, the process measures the rolling angle $\varphi$ at which the output of the pressure sensor 17 becomes a minimum.

Next, rotating the rotating stage 16f by an amount Δθ for the direction determined above described procedure, where the amount Δθ may be optional depending on the efficiency of the alignment process and the accuracy of the alignment. After the increment of the rotating angle, the rotating angle becomes $\theta_0 + \Delta\theta$, and a rolling angle at which the output of the pressure sensor becomes another minimum $A_1$, at step S4. Next, the process compares two outputs, $A_0$ and $A_1$, of the pressure sensor 17 each obtained at the rotating angles, $\theta_0$ and $\theta_1 = \theta_0 + \Delta\theta$. When the former $A_0$ is greater than the latter $A_1$, the rotating angles, $\theta_0$ and $\theta_1$, are still in conditions where the output of the pressure sensor 17 shows a negative slope. Accordingly, the process transfers the result $A_1$ to $A_0$, and $\theta_1$ to $\theta_0$, and further rotates the base 14 by Δθ. The, another minimum output $A_1$ of the pressure sensor 17 is measured as rolling the rolling stage 16a at step S3 until the currently measured minimum output $A_1$ of the pressure sensor 17 becomes greater than the previously measured minimum output $A_0$.

When the currently measured minimum output $A_1$ of the pressure sensor 17 becomes greater than the previously measured minimum output $A_0$, the process evaluates a minimum output at the rotating angle $\theta_1' = \theta_0 + \Delta\theta/2$, that is, a minimum output at an intermediate rotating angle, at steps S6 and S7. Step S6 sets the increment amount Δθ of the rotating angle in half, and step S7 measures the minimum output $A_1$ of the pressure sensor 17. As steps S8, the process compares thus measured minimum output $A_1$ at the half of the rotating angle with the previously measured minimum output $A_0$. When the latter, the previously measured minimum output $A_0$, is greater than the former, the currently measured minimum output $A_1$, the process replaces the previously obtained output $A_0$ with the currently obtained output $A_1$, and also the previous rotating angle $\theta_0$ with the current rotating angle θ1 at steps 15, and iterates steps from S3 to S7. On the other hand, when the currently obtained minimum output $A_1$ is greater than the previously obtained minimum output $A_0$, the process advances steps S9 and S10 at which the convergence of the rotating angle θ may be evaluated.

That is, at step S9, the process compares the difference between the previously measured minimum output $A_0$ and the previously measured minimum output $A_1$, and returns the step S6 when the difference in normalized by the previously obtained minimum output $A_0$ is greater than a first reference ref1, or when the increment amount of the rotating angle Δθ normalized by the rotating angle θ is greater than a second reference ref2. When both of the former, the difference between the minimum outputs, $A_1$ and $A_0$, and the increment amount Δθ are smaller than respective references, ref1 and ref2; the process decides that the rotating angle $\theta_s$ at which the direction of the end surface 9b is aligned with the direction of the ceiling 7a; and advances the optical aligning steps of S11 to S12.

Figure 8:
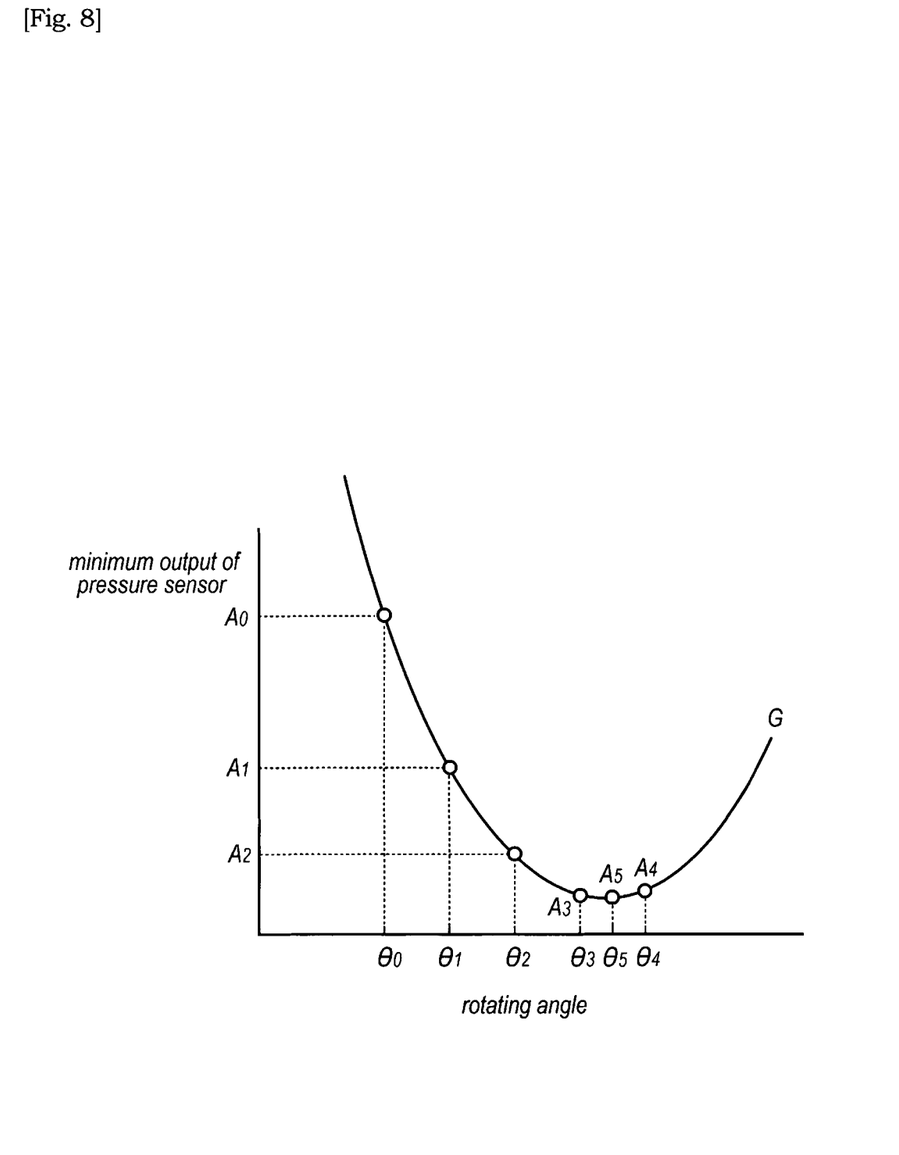
FIG. 8 schematically illustrates a relation of a minimum pressure output from the pressure sensor against the rotating angle.

FIG. 8 show a typical relation of the rotating angle θ against the minimum output of the pressure sensor 17. In FIG. 8, a behavior G shows theoretical estimation of the minimum output of the sensor 17. That is, setting the rotating angle between the optical device 3 and the receptacle 4 to be $\theta_0$, the minimum output may be obtained as varying the rolling angle $\varphi$. That is, varying the rolling angle (pas keeping the pitching angle $\psi$ at the rotating angle $\theta = \theta_0$, the output of the pressure sensor 17 varies as the rolling angle φ, and the minimum output of the sensor 17 may be easily determined to be $A_0$, step S3. Then, increasing the rotating angle θ by Δθ, which means that $θ_1=θ_0+Δθ$, the procedures for the rolling angle same with those described above may easily determine the minimum output $A_1$ of the pressure sensor 17, step S4. Comparing two minimum outputs, $A_0$ and $A_1$, and the step back to S4 as replacing the minimum outputs, $A_1$ to $A_0$ and $θ_1$ to $θ_0$, because the comparison shows a condition of $A_1<A_0$. These procedures of getting the minimum output $A_n$ for the rotating angle $θ_n$ are iterated to the step of n=4. At the fourth iteration where the rotating angle is set to be $θ_4$, the current minimum output $A_4$ becomes greater than the previous minimum output $A_3$ of the pressure sensor 17. Then, the step advances to step S5, where the increment of the rotating angle Δθ is set to be half of the current increment, and the minimum output $A_5$ is measured at the rotating angle of $θ_5$, which is a middle of the rotating angles of $θ_3$ and $θ_4$. Thus, the procedures steps from S4 to S10 are iterated until the two conditions of steps S9 and S10 are satisfied. When two conditions are satisfied, the rotating angle becomes θs and the rolling angle φ becomes φs.

The process next determines the pitching angle ψ around the Y-direction. Specifically, at the rotating angle $θ_s$, the process finds the minimum output of the pressure sensor 17 as varying the pitching angle ψ by the pitching stage 16b. Once determining the minimum output of the pressure sensor 17, the process then rotates the rotating stage 16f clockwise or counterclockwise by a preset amount, and performs steps to obtain the minimum output of the pressure sensor 17 as varying the pitching angle. Thus, the process alternately iterates the steps to determine the rotating angle θ as varying the rolling angle φ and fixing the pitching angle ψ; and as varying the pitching angle ψ and fixing the rolling angle φ, until the rotating angles thus determined by two procedures are substantially equal to each other.

The process finally sets the angles of the rolling angle φ, pitching angle ψ, and rotating angle θ thus determined through the steps above described in $φ_s$, $ψ_s$, and $θ_s$; and performs the optical alignment in a plane perpendicular to the axis L.

Figure 9:
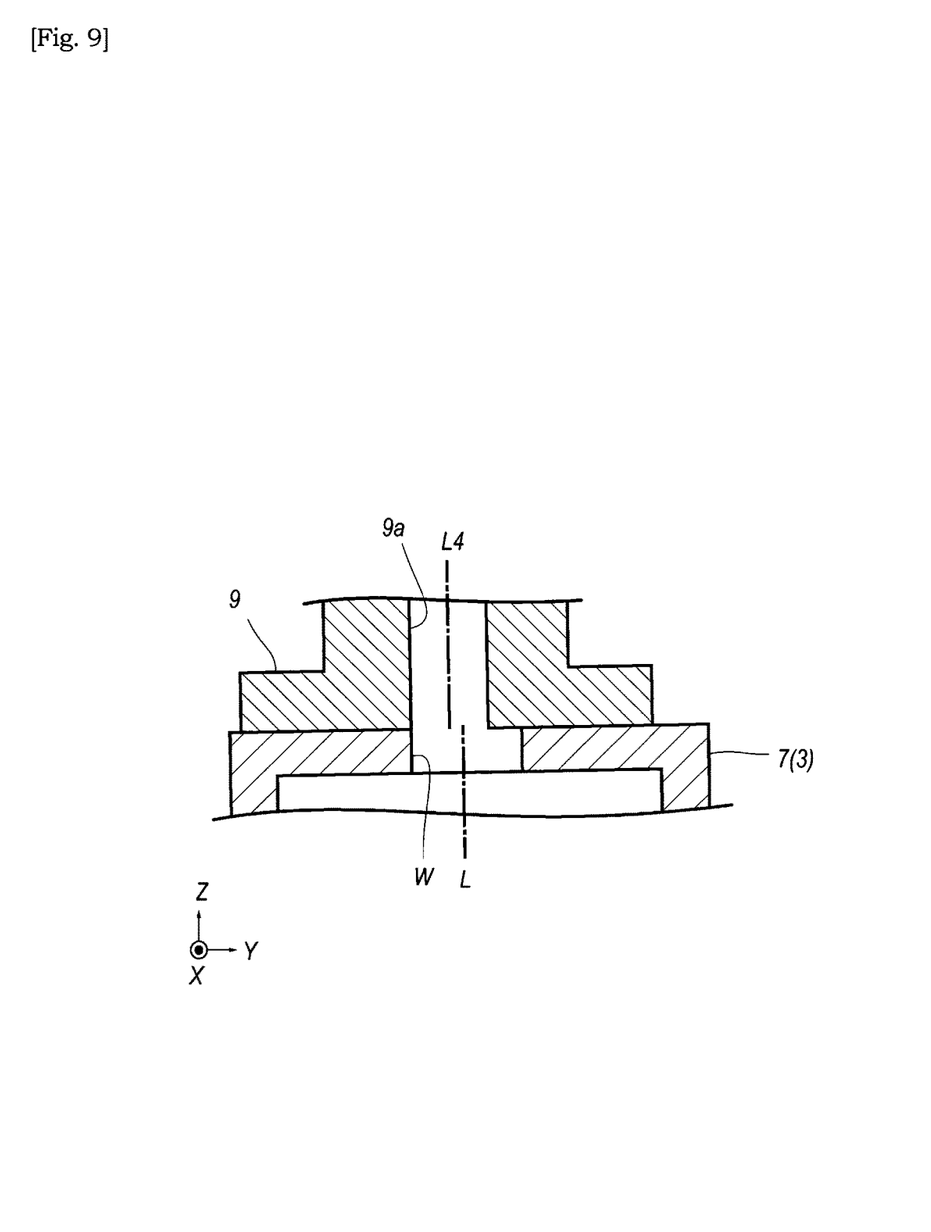
FIG. 9 magnifies a portion where the end surface of the receptacle faces the top of the optical device when the optical device in an axis thereof is set in parallel to an axis of the receptacle.

Specifically, referring to FIG. 9, the optical device 3 in the optical axis L thereof is now in parallel to the optical axis L4 of the receptacle 4 by the aforementioned procedures, but two axes are only in parallel to each other but not always aligned to each other. Accordingly, sliding the X-stage 16c and the Y-stage 16d of the stage 16 as fixing the other stages, 16a, 16b, and 16f, the axis L of the optical device 3 is horizontally moved to align with the axis L4 of the receptacle 4.

Specifically, when the optical module 1 is a transmitter optical module implementing an LD therein, the process practically activates the LD by supplying a bias current thereto and detects an output of the LD through an external optical fiber set within the sleeve 4. Sliding the X-stage 16c and the Y-stage 16d of the goniometer 16, the relative position between the receptacle 4 and the optical device 3 may be determined at a point at which the output of the LD 2 detected through the external optical fiber becomes a maximum. When the optical module is a type of receiver optical module that implements a PD therein, the process provides an external optical beam to the optical module 1 through the external fiber inserted into the optical receptacle 4 and detects an electrical output of the PD 2 through the lead pins 6a. Sliding the X-stage 16c and the Y-stage 16d, the receptacle 4 is fixed in a point at which the electrical output of the PD 2 becomes a maximum.

Figure 10:
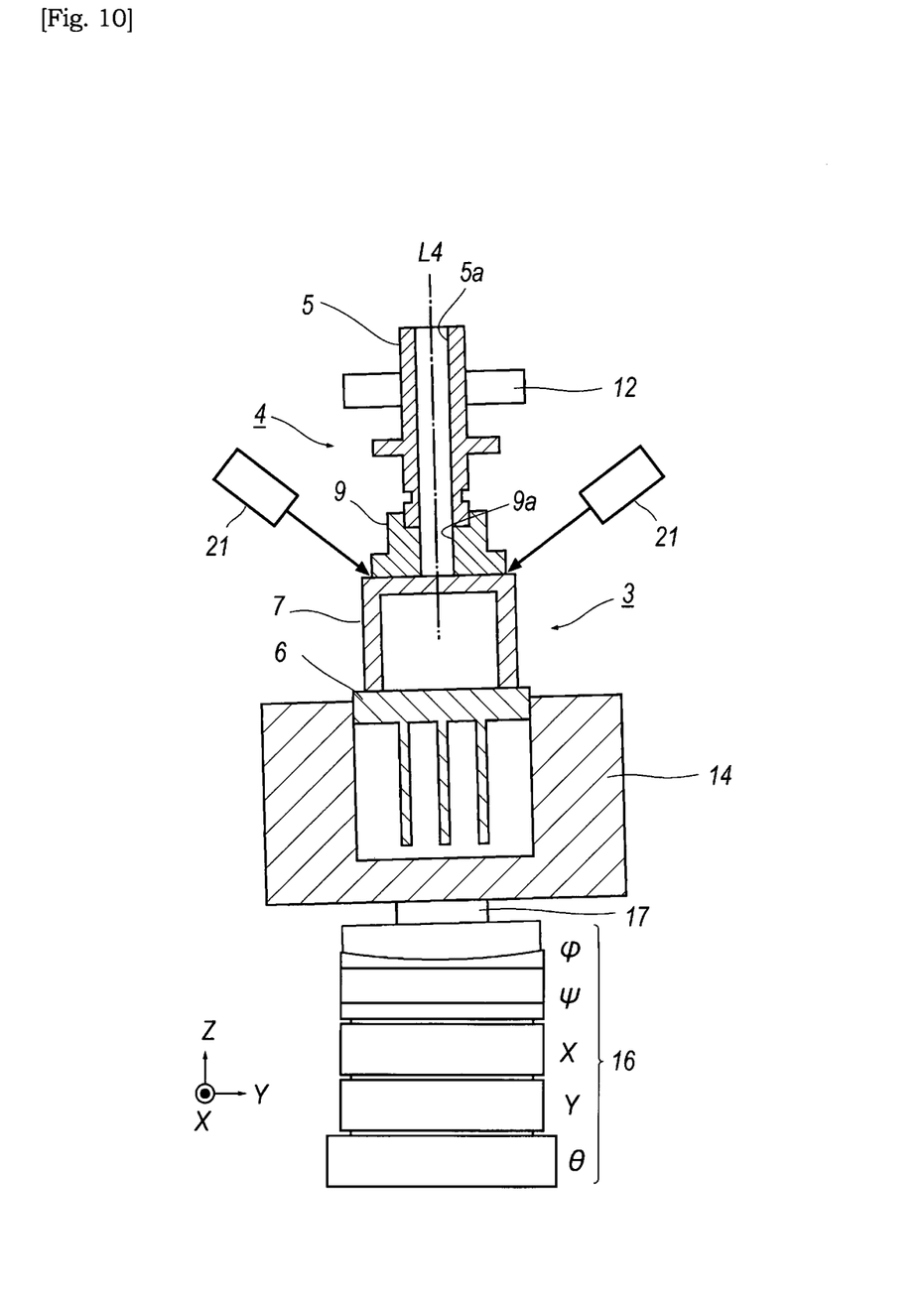
FIG. 10 schematically illustrates a process to fix the receptacle to the optical device.
Figure 11:
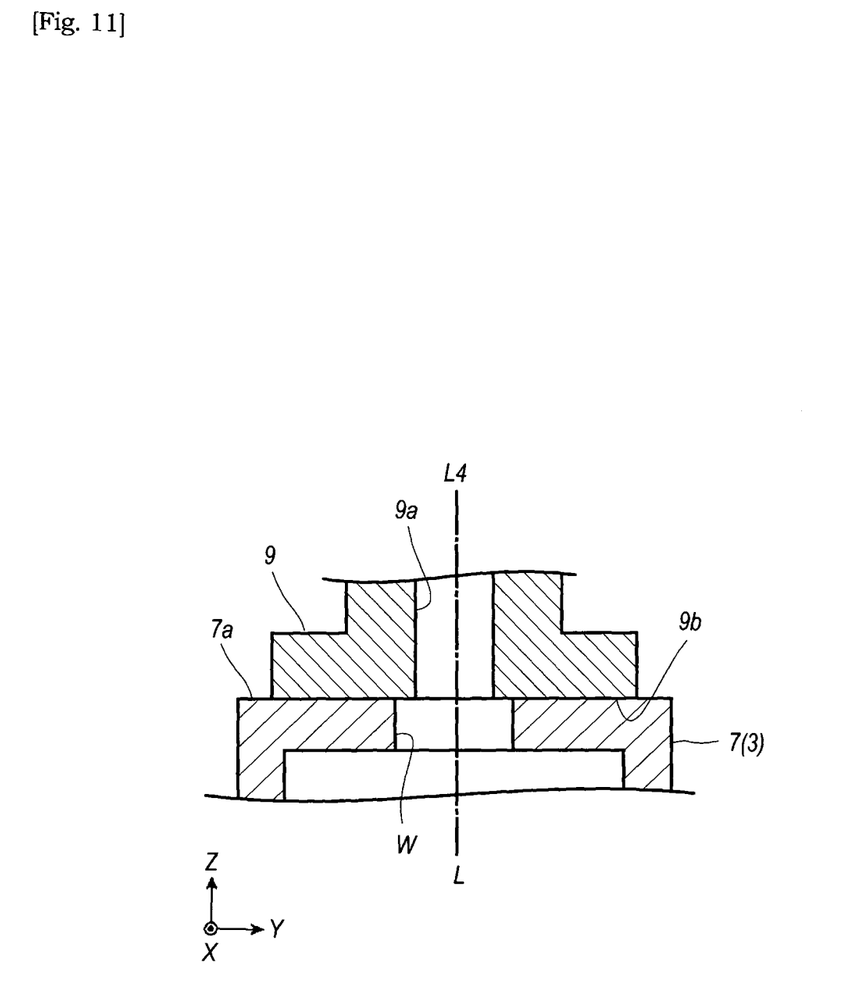
FIG. 11 magnifies a portion where the end surface of the receptacle faces the top of the optical device after the optical alignment therebetween is fully carried out.

After the optical alignment between the receptacle 4 and the optical device 3, where the axis L of the optical device 3 becomes in parallel to the axis IA of the receptacle 4 and aligned therewith, the holder 9 is welded to the cap 7 by YAG laser as maintaining positional relations of the rotating angle θ, the rolling angle φ, the pitching angle ψ, the X position, and the Y-position, which is shown in FIG. 10. Thus, the optical module 1 is completed. Also, FIG. 11 magnifies the portion where the end surface 9b of the holder 9 faces and closely contact to the ceiling 7a of the cap 7 as aligning the axis L of the optical device 3 with the axis of the receptacle TA.

Figure 12:
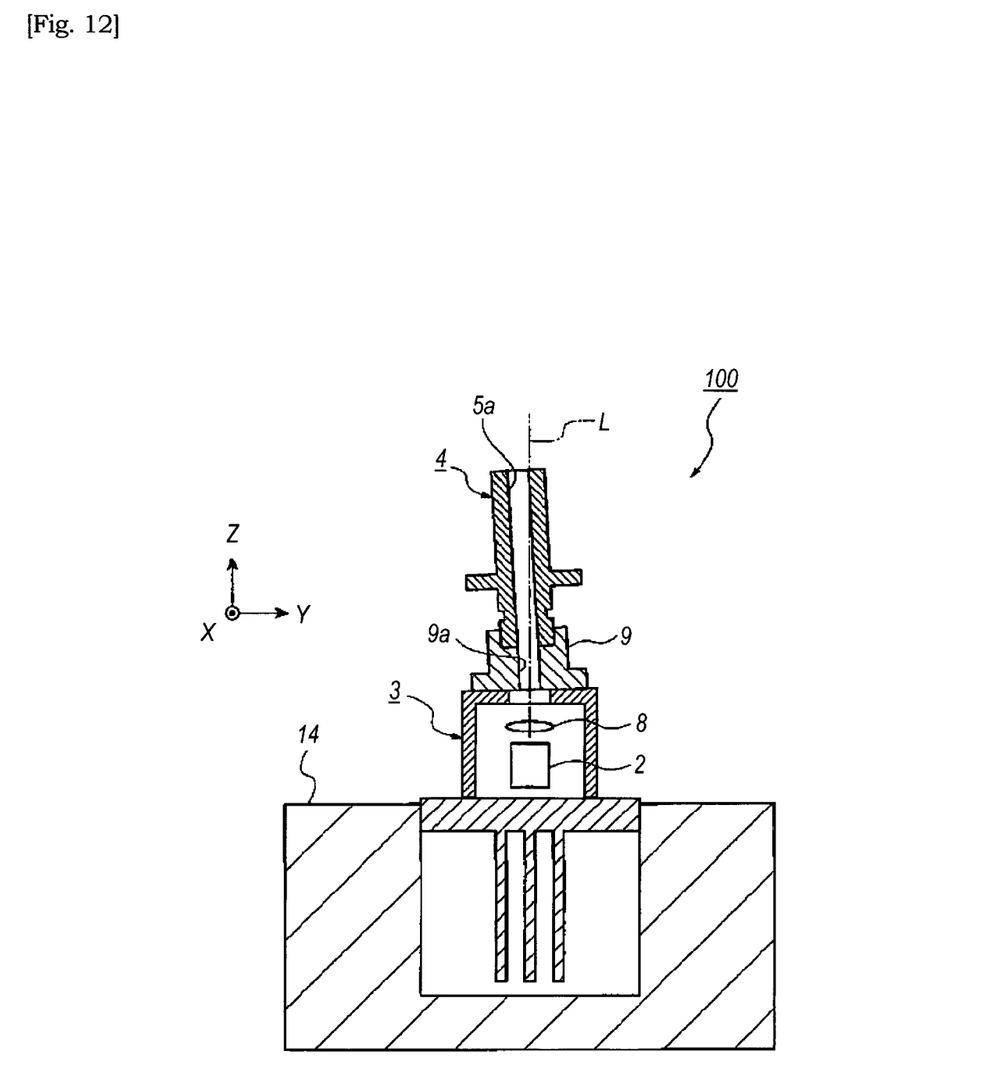
FIG. 12 schematically illustrates a process to assemble the optical device with the receptacle according to a process comparable to that of the present application.

FIG. 12 magnifies a portion of the end surface 9b and the ceiling 7a of an optical module assembled by a conventional process. As shown in FIG. 12 and already explained, the end surface 9b and the ceiling 8a possibly deviate from a true horizontal plane K due to a tolerance in physical dimensions thereof and a tolerance of the assembling process thereof. In order to align, for instance, the end surface 9b with the ceiling 7a, at least one of two members must be inclined such that the surface of the at least one member becomes in parallel to the surface of the other member. For such an assembly, as shown in FIG. 12, the optical axis L of the optical device 3 is possibly interfered with a wall of the receptacle.

The tilt angle between the end surface 9b of the receptacle 4 and the ceiling 7a of the cap 7 depends on the rotating angle θ around the Z-axis. The method according to the present embodiment includes primarily two procedures, that is, (i) setting the rotating angle $θ_n$ and (ii) getting the minimum output $A_n$ of the pressure sensor 17 as varying the rolling angle φ around the X axis, and iterating the procedures (i) and (ii) until the rotating angle θ converges in θs(φ). The procedures (i) and (ii) above are further iterated for the pitching angle ψ until the rotating angle θ converges in θ (ψ); and iterated until two converged rotating angles, θs(φ) and θs(ψ), becomes substantially equal to θs. At the rotating angle θs, and the rolling angle φs and the pitching angle ψs, the end surface 9b of the receptacle 4 becomes substantially in parallel to the ceiling 7a of the cap 7. Thus, the optical device 3 in the axis L thereof becomes substantially in parallel to the axis IA of the receptacle 4. Further aligning the optical device 3 with the axis IA in the XY plane, the optical device 3 is finally optically aligned with the axis L4 of the receptacle 4.

Because the present embodiment provides the positioner 10 including the pressure sensor 17 between the base 14 and the goniometer 16, where the pressure sensor 17 may sense the downward pressure caused by the receptacle 4 placed on the cap 7. The receptacle 4 is pushed downward against the cap 7 such that, even when the cap 7 rotates by one turn with respect to the receptacle 4, the end surface 9b of the holder is not detached from the ceiling 7a. The positioner 10 also includes the controller 13 and motors to move the goniometer 16 and the arm 12 that holds the receptacle 4 automatically under the control of the controller 13. Thus, the positioner 10 of the embodiment may carry the procedures to obtain the tilt angle between the receptacle 4 and the optical device 7, and to align the optical device 3 with the receptacle 4 automatically.

Modified Process

The process for obtaining the rotating angle θ above described at which the end surface 9b of the holder 9, or the receptacle 4, becomes in parallel to the ceiling 7a of the cap 7, or the optical device 3, is some complicated although the obtained rotating angle θs becomes precise. A modified process described below simplifies the whole procedures to make the two surfaces, the end surface 9b and the ceiling 7a, in parallel to each other.

The modified process first determines the rotating angle θs by steps of, first rotating the rotating stage 16f in a turn, 360°, as sensing the pressure applied to the optical device 3 from the receptacle 4. As described, the pressure thus measured shows a sine curve with respect to the rotating angle θ, and may determine a critical rotating angle θs at which the pressure sensed by the pressure sensor 17 becomes a minimum. Then, fixing the rotating angle at θs, the rolling angle φ and the pitching angle ψ are adjusted so as to minimize the pressure applied from the receptacle and sensed by the pressure sensor 17. Iterating the adjustment of the rolling angle φ and that of the pitching angle ψ a few times, the conditions of the angles may converge in the respective critical angles, φs and ψs. Finally, similar to the aforementioned embodiment, the XY alignment by sliding the X-stage 16c and the Y-stage 16d is carried out. Because the modified process is simple compared with the former process according to the primary embodiment, the modified process may be positively introduce into a practical production of the optical module.

In the foregoing detailed description, the method and apparatus of the present invention have been described with reference to specific exemplary embodiment thereof. However, it would be evident that various modifications and changes may be made thereto without departing from the broader spirit and scope of the present invention. The present specification and figures are accordingly to be regarded as illustrative rather than restrictive.

The invention claimed is:

1. A method of assembling an optical module that comprises an optical device and a receptacle, the optical device installing an optical element that generates or receives an optical signal, the receptacle receiving an external optical fiber optically coupling with the optical element in the optical device, the method comprising steps of:
    making the optical device in contact to the receptacle by lifting the receptacle down to the optical device;
    making an axis of the optical device along a Z-direction in parallel to an axis of the receptacle along the Z-direction by steps of,
        determining a rotating angle of the optical device with respect to the receptacle at which the optical device causes a minimum pressure against the receptacle, as varying a rolling angle but fixing a pitching angle of the optical device with respect to the receptacle, where the rolling angle is around an X-direction perpendicular to the Z-direction and the pitching angle is around a Y-direction perpendicular to the Z-direction and the X-direction,
        determining another rotating angle of the optical device with respect to the receptacle at which the optical device causes another minimum pressure against the receptacle, as varying the pitching angle but fixing the rolling angle, and
        iterating the step of determining the rotating angle and the step of determining the another rotating angle until the rotating angle substantially coincides with the another rotating angle; and
    aligning the axis of the optical device with the axis of the receptacle.

2. The method of claim 1,
wherein the step of determining the rotating angle includes steps of:
    at a first rotating angle, obtaining a first minimum pressure caused by the optical device against the receptacle as varying the rolling angle and fixing the pitching angle;
    rotating the optical device with respect to the receptacle by an amount from the first rotating angle, the rotating angle being a second rotating angle;
    obtaining a second minimum pressure as varying the rolling angle and fixing the pitching angle;
    comparing the first minimum pressure with the second minimum pressure;
    when the second minimum pressure is greater than the first minimum pressure, rotating the optical device from the first rotating angle by half of the amount, and obtaining the second minimum pressure again, or
    when the second minimum pressure is smaller than the first minimum pressure, rotating the optical device from the second rotating angle by the amount; and
    iterating the steps of rotating the optical device with respect to the receptacle and obtaining the minimum pressure until a second minimum pressure substantially coincides with the first minimum pressure and the second rotating angle substantially coincides with the first rotating angle.

3. The method of claim 1,
wherein the step of determining the another rotating angle includes steps of:
    at a first rotating angle, obtaining a first minimum pressure caused by the optical device against the receptacle as varying the pitching angle and fixing the rolling angle;
    rotating the optical device with respect to the receptacle by an amount from the first rotating angle, the rotating angle being a second rotating angle;
    obtaining a second minimum pressure as varying the pitching angle and fixing the rolling angle;
    comparing the first minimum pressure with the second minimum pressure;
    when the second minimum pressure is greater than the first minimum pressure, rotating the optical device from the first rotating angle by half of the amount, and obtaining the second minimum pressure again, or
    when the second minimum pressure is smaller than the first minimum pressure, rotating the optical device from the second rotating angle by the amount; and
    iterating the steps of rotating the optical device with respect to the receptacle and obtaining the minimum pressure until a second minimum pressure substantially coincides with the first minimum pressure and the second rotating angle substantially coincides with the first rotating angle.

4. The method of claim 1,
further including a step, before the step of making the axis of the optical device along the Z-direction, determining a direction of rotating the optical device with respect to the receptacle.

5. The method of claim 4,
wherein the step of determining the direction includes steps of:
    at a first rotating angle, obtaining a first minimum pressure caused by the optical device against the receptacle as fixing the rolling angle and the pitching angle;
    at a second rotating angle greater than the first rotating angle by an amount, obtaining a second minimum pressure as fixing the rolling angle and the pitching angle;

comparing the first minimum pressure with the second minimum pressure; and determining the direction such that, when the first minimum pressure is smaller than the second minimum pressure, the amount is negative and, when the first minimum pressure is greater than the second minimum pressure, the amount is positive.

6. The method of claim 1, wherein the optical device includes a stem and a cap, the stem mounting the optical element thereon, the cap enclosing the optical element within a space formed by the stem and the cap, wherein the method further includes a step of welding the cap with the stem.

7. The method of claim 6, wherein the step of welding the cap includes a step of resistance welding of the cap to the stem.

\* \* \* \* \*